A. KADOW.
MECHANISM FOR EFFECTING SPINDLE MOVEMENTS IN GLASS FORMING APPARATUS.
APPLICATION FILED JUNE 4, 1917.
1,315,130.
Patented Sept. 2, 1919.
6 SHEETS—SHEET 5.
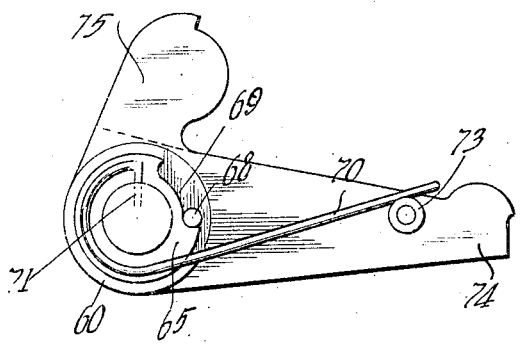
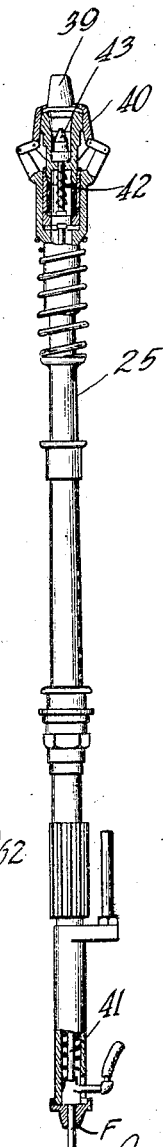
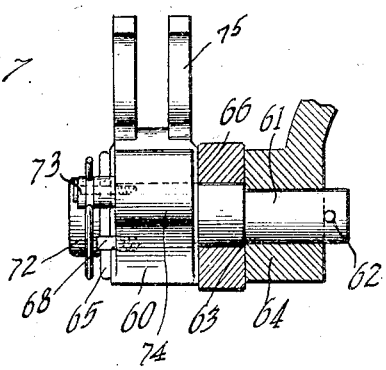
WITNESSES:
INVENTOR
August Kadow
BY
Barnes L Truman
ATTORNEY

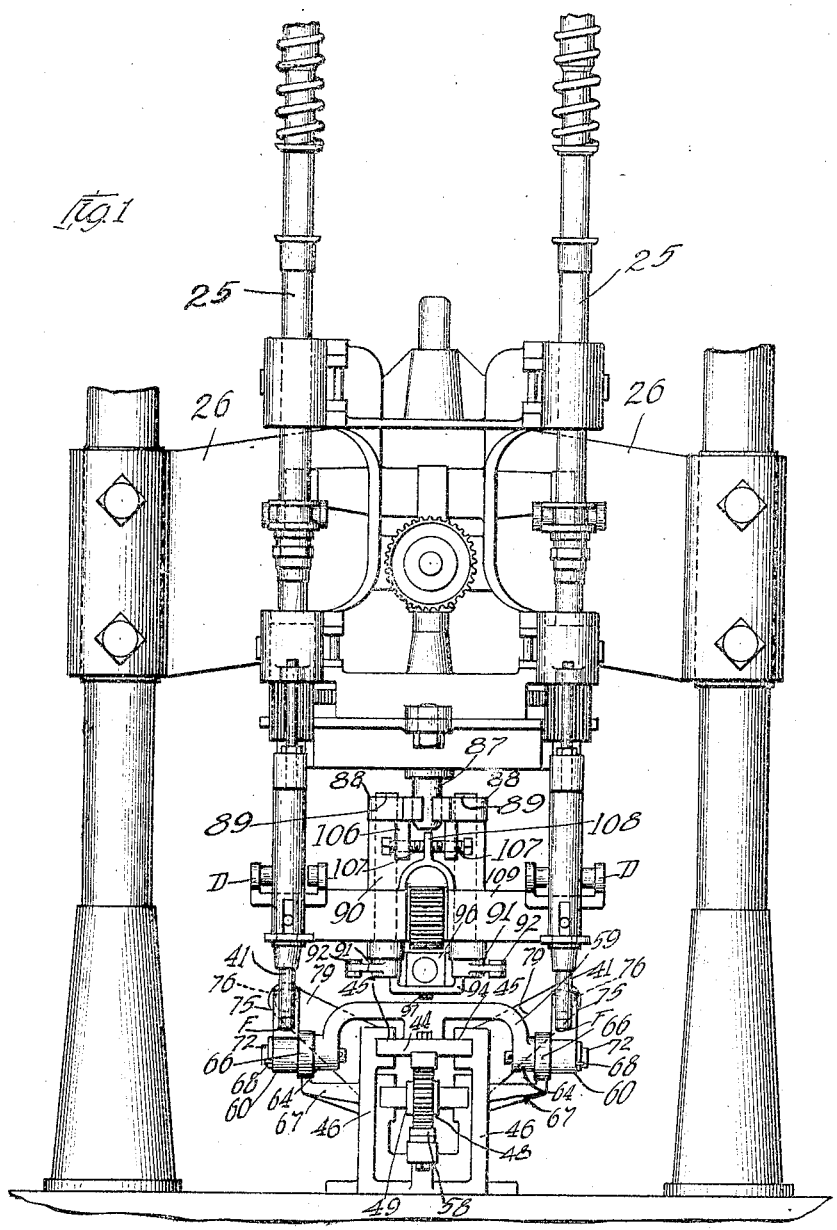

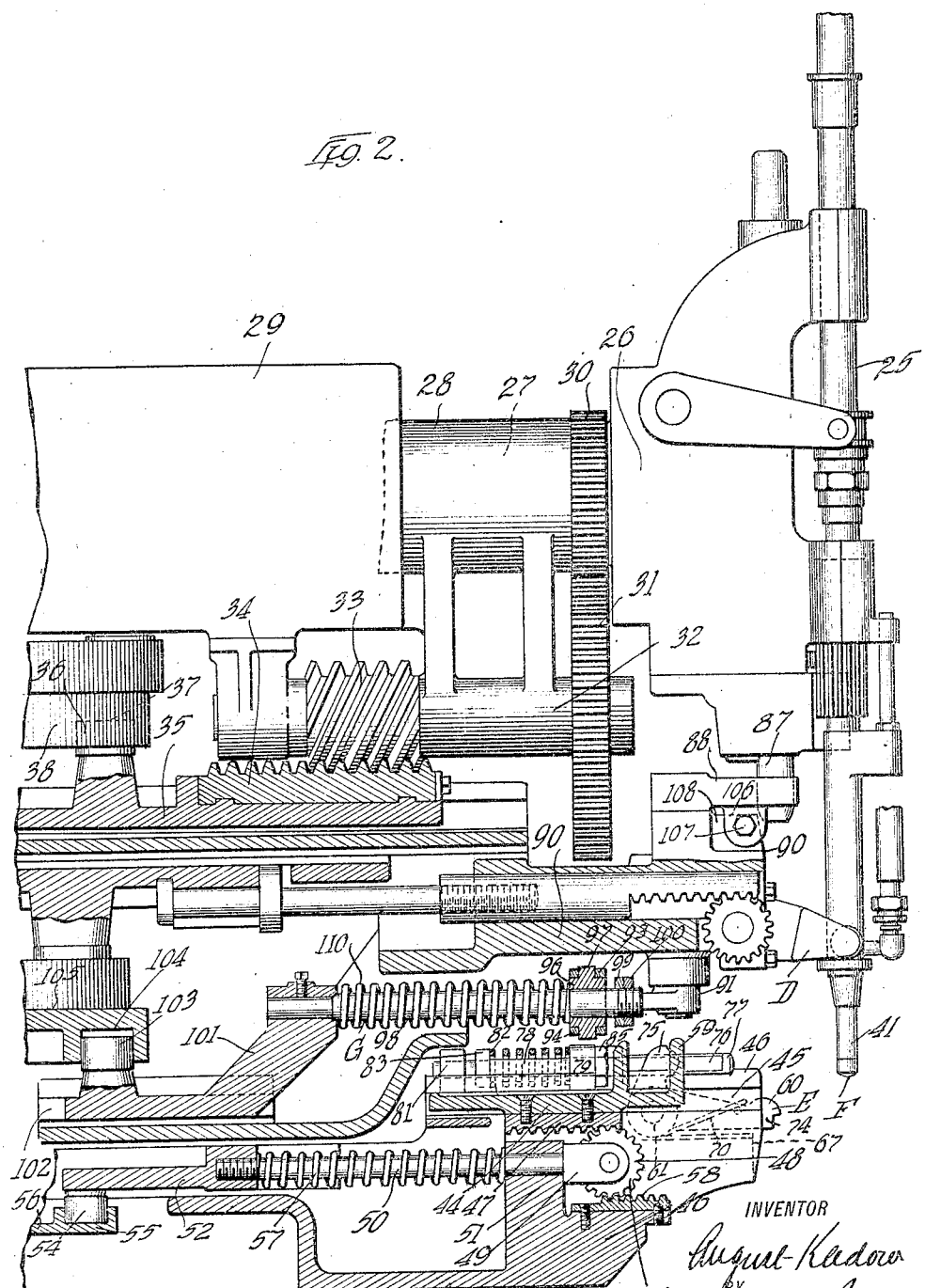

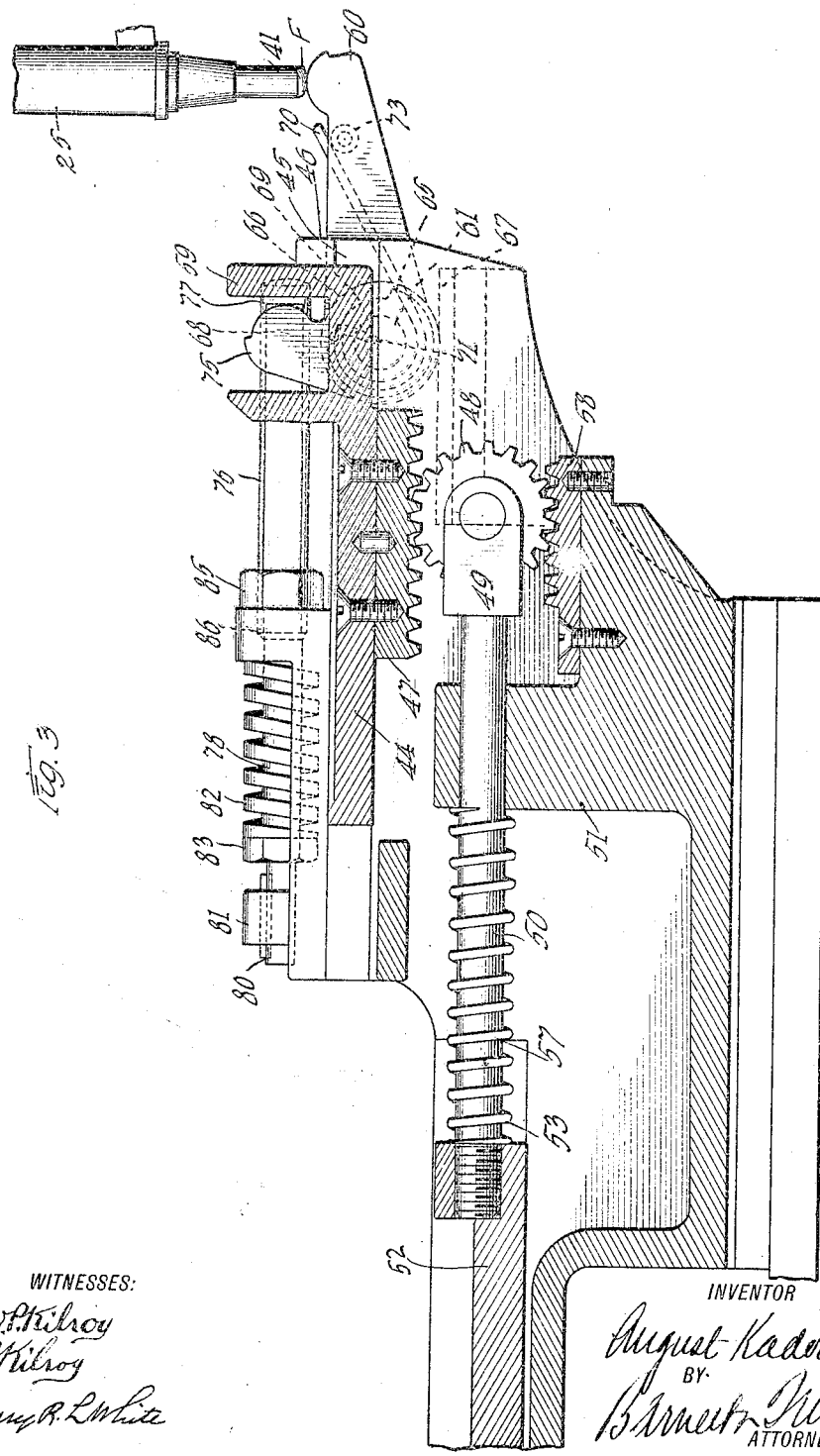

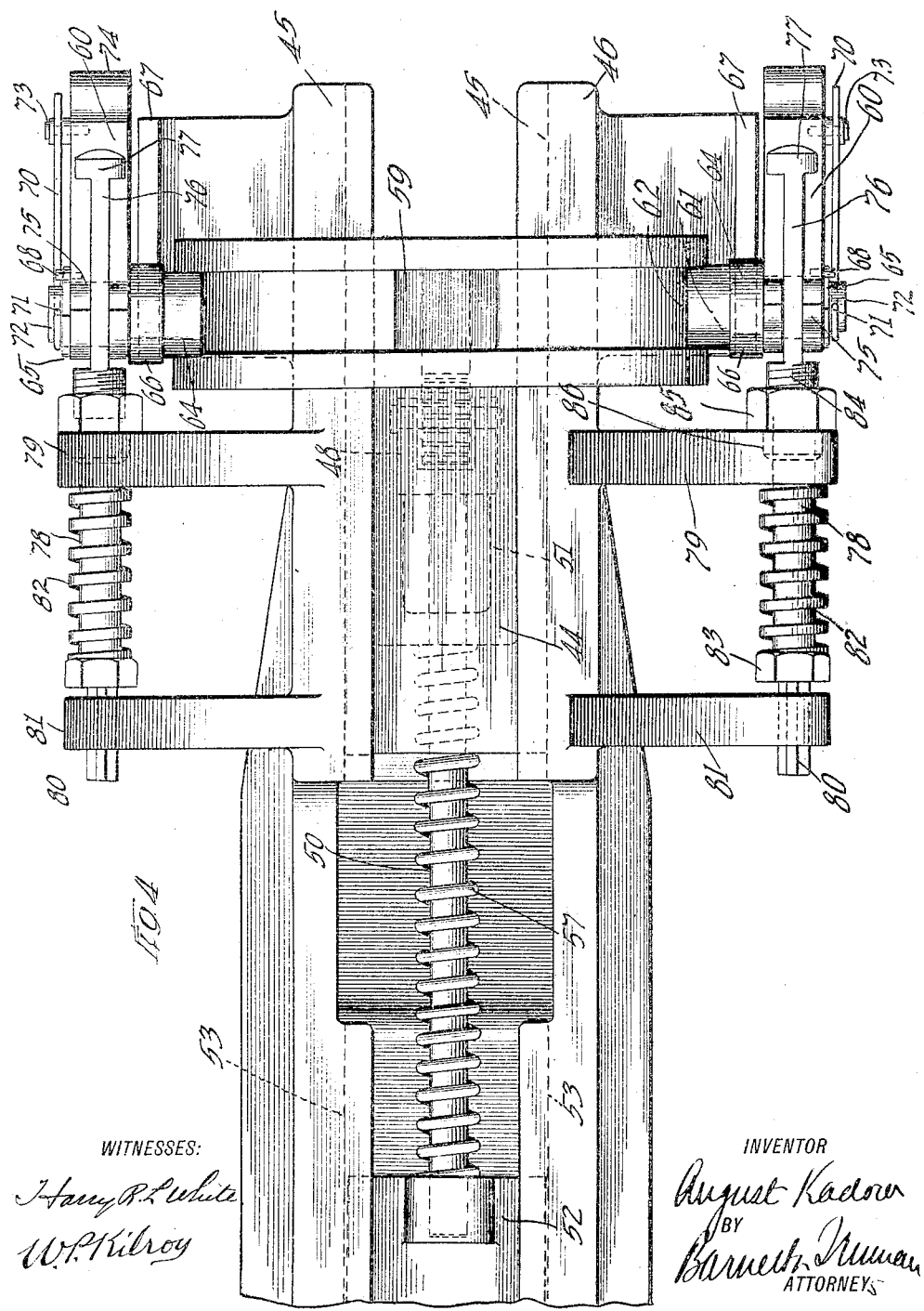

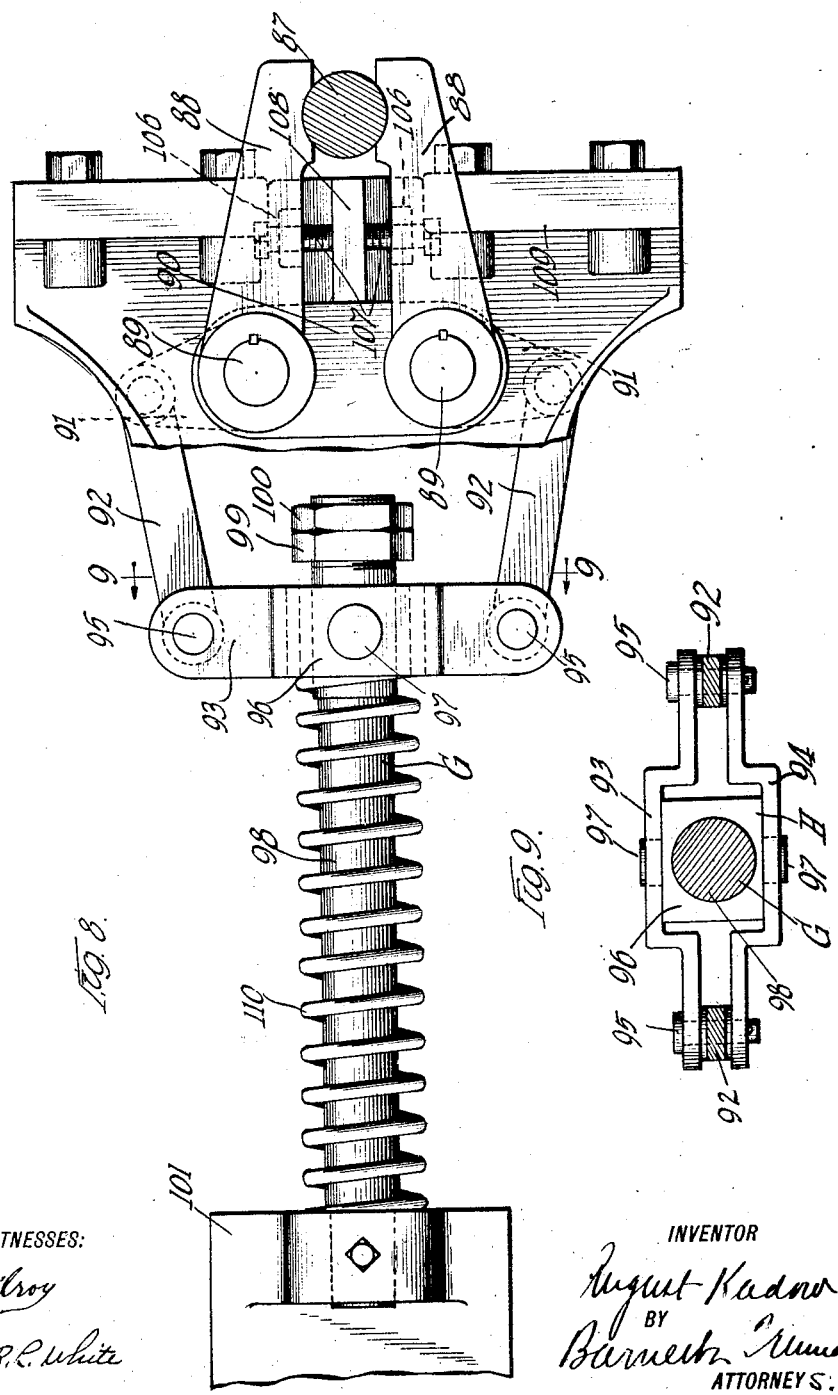

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

MECHANISM FOR EFFECTING SPINDLE MOVEMENTS IN GLASS-FORMING APPARATUS.

1,315,130. Specification of Letters Patent. Patented Sept. 2, 1919.

Application filed June 4, 1917. Serial No. 172,703.

*To all whom it may concern:*

Be it known that I, AUGUST KADOW, a citizen of the United States, residing at Toledo, in the county of Lucas and State of Ohio, have invented certain new and useful Improvements in Mechanisms for Effecting Spindle Movements in Glass-Forming Apparatus, of which the following is a specification.

My invention relates to apparatus for the manufacture of glass articles in which the glass blank is developed by blowing, for example, and other operations, while fixed to a spindle or blow-pipe. A machine of this type is shown in my co-pending application Serial No. 570,621, filed July 6, 1910, and also in Patent No. 1,248,664, issued to me Dec. 4, 1917. In this machine, which is intended particularly for the manufacture of electric light bulbs, or other hollow glass articles, the blank is developed on the spindle by blowing, by swinging the blank out through oscillating movements of the spindle, and by revolving the spindle on its longitudinal axis with the blank inclosed in the mold. In order to properly fix or set the blank in the holding jaws of the spindle and to center the air employed in the blowing operation, the spindle is provided with a plunger which is thrust into the inner end of the blank immediately after the blank has been received from the gathering mechanism.

One of the objects of my present invention is to provide an improved mechanism for operating the plunger. In the machine shown in my co-pending application above referred to, there is a tendency, under certain circumstances, for the plunger actuating element to exert a side thrust on the plunger which is objectionable particularly where, as is desirable in certain cases, the plunger is given any considerable longitudinal movement. The side thrust, in such case, may cause a bending or cramping of the parts of the spindle which interferes with the nicety of operation essential in apparatus of this character. My present invention provides a plunger actuating device which is first brought into substantial alinement with the end of the plunger, and is then brought to bear against the plunger, after which the actuating mechanism is withdrawn so as not to interfere with subsequent movements of the spindle.

A further object of the invention is to provide improved mechanism for accurately centering the spindle, that is to say, bringing the spindle to and maintaining the same in a fixed position, for example vertical position, following the swinging out operation above referred to in which the spindle is oscillated on an axis transverse to its longitudinal axis. The improved mechanism is of particular utility in connection with a machine such as is shown in my co-pending application Serial No. 141,885, filed January 11, 1917, in which a plurality of spindles, two, for example, are supported on the same oscillating support. In this connection my improvement involves simplification of the apparatus besides insuring a more accurate centering of the spindles. The centering device, however, might be employed in connection with a machine such as is shown in application Serial No. 570,621, in which single spindles are employed instead of spindles arranged in pairs.

The invention consists in the new and improved constructions, arrangements and devices to be hereinafter described and claimed for carrying out the above stated objects and such other incidental objects as will appear from the following description.

The invention is illustrated, in a preferred embodiment, in the accompanying drawings wherein Figure 1 is a fragmentary elevation of a machine of the type disclosed in the applications above referred to, showing a pair of spindles, the means employed for supporting them, together with the centering and plunger operating mechanisms constituting my present invention.

Fig. 2 is a sectional view, with parts in elevation, of the mechanisms shown in elevation in Fig. 1.

Fig. 3 is a detail sectional view of the plunger operating mechanism.

Fig. 4 is a plan view of this mechanism.

Fig. 5 is a view, in elevation, with parts in section, of one of the spindles.

Fig. 6 is a detail view, in elevation, of one of the plunger actuating members.

Fig. 7 is a cross sectional view of the same.

Fig. 8 is a plan view of the spindle centering mechanism, and

Fig. 9 is a sectional view on line 9—9 of Fig. 8.

Like characters of reference designate like parts in the several figures of the drawings.

Referring to the drawings, two spindles, 25, are shown which are supported, by means that need not be described in detail, on a support 26 having a hub 27 revolubly mounted in suitable bearings 28 on the frame 29 of the machine. The hub 27 of the spindle support is provided with a gear 30 meshed with a gear 31 on a shaft 32, the latter provided with a worm gear 33 meshed with a rack 34 on a slide 35 carrying a roller 36 adapted to lie in a cam groove 37 formed on the under side of a stationary cam ring 38. The spindles and spindle support form part of a rotary structure and reciprocating movements are imparted, at the proper times, to slide 34 by suitable sinuosities in the cam groove 37. This mechanism is substantially the same as the spindle oscillating mechanism shown in the applications above referred to.

In construction the spindles are the same as those shown in Patent No. 1,248,664, heretofore referred to and will not require description as to all of its details.

Referring to Fig. 5, the glass blank 39 is held in place in the end of the spindle by means of jaws 40. The plunger 41 is made in sections and the outer section 42 is provided with a tip 43 adapted to be forced into the glass blank 39. The purpose of this is, first, to firmly fix the blank in the spindle jaws, and, second, to make an indentation which will properly center the air employed for blowing the blank.

The mechanism for imparting longitudinal movement to the spindle plunger in the direction toward the blank is constructed as follows (Figs. 1, 2, 3, 4, 6 and 7): 44 is a slide movable in guides 45 formed in a frame 46 constituting part of the rotary structure of the machine. On the under side of the slide 44 is a rack 47 meshed by a gear wheel 48 arranged in a fork 49 on the end of a rod 50 which passes slidably through a web 51 on the framework 46 and secured at its inner end to a slide 52 which moves in guideways 53 formed in the framework 46. Slide 52 carries a roller 54 which projects into a camway 55 formed in a stationary cam ring 56. 57 is a coiled spring surrounding rod 50 and interposed between web 51 and slide 52. Arranged on the frame 46, under and in mesh with gear 48, is a rack 58. By the means just described movement imparted to slide 52 by inward or outward bends in cam groove 55 is transmitted to the slide 44.

The slide 44 is provided with a cross piece 59 to opposite ends of which are pivoted plunger actuating bell cranks 60 which operate simultaneously to impart longitudinal movement to the plungers 41 of spindles 26. It will suffice to describe one of these bell cranks and its associated mechanisms. Secured to the end of cross piece 59 is a pivot pin 61 which is held in rigid relation with the cross piece 59 (but subject to adjustment when the machine is assembled,) by means of a key 62. The pivot pin 61 is formed with a shoulder 63 (Fig. 7) which bears against the boss 64 on the cross piece 59 through which the pivot pin extends. The key 62 is driven through its opening in the pivot pin against the other side of boss 64. The pivot pin has an integral head 65 and between the head and boss 64 are arranged the bell crank 60, above referred to, and a roller 66. The roller is adapted to bear on a track 67 on framework 46. The bell crank 60 is provided with a stop pin 68 which moves in a recess 69 in the head 65 of the pivot pin 61. 70 is a spring, one end 71 of which is anchored to the reduced portion 72 of the head 65 of the pivot pin, the other end of which bears upon a roller 73 on the arm 74 of the bell crank 60. This is the arm which is brought to bear against the end of plunger 41 when the bell crank is rocked by movement of slide 44. The other arm 75 of the bell crank is bifurcated and a stop member 76 having a head 77 is arranged so as to extend through the slot provided by the bifurcation of arm 75. The stop member 76 is provided with an extension 78, which is round in cross section, and is supported slidably in a web 79 on the frame 46. The extremity 80 of this extended portion of the stop member is hexagonal in cross section and passes through a web 81 on the framework 46. 82 is a coiled spring intervening between web 79 and a nut 83 on the portion 78 of the stop member. The latter is formed with a threaded portion 84 for an adjusting nut 85. The web 79 is preferably recessed at 86 so as to permit lengthwise adjustment of the stop member to this extent if necessary.

The operation of the plunger actuating mechanism above described is as follows: Assuming the parts to be in the positions shown in Fig. 2, an outward bend of cam groove 55 imparts an outward radial movement to slide 52 and a similar movement to slide 44. The first part of the outward movement of slide 44 brings the end of arm 74 of bell crank lever 60 into substantial alinement with the extremity of plunger 41. About this time the bifurcated arm 75 of the bell crank lever comes into contact with the head 77 of the stop member 76. Further outward movement of the slide 44 causes the bell crank to rock so that the end of arm 74 thereof is forced against the end of the spindle plunger 41.

The rocking movement of the plunger actuating bell crank is timed through adjustment of the stop member 76 by means of nut 85. The spring 82 holds the stop member in proper position, the spring being strong enough to resist the force required for operating the spindle plunger. The spring 82 will yield, however, if necessary, to prevent destruction of the apparatus through misadjustment or otherwise. On the return of the slides the spring 70 returns the bell crank to its original position. The purpose of spring 57 is to prevent lost motion in the connections between cam 55 and slide 44. The thrust of the bell crank against the spindle plunger is carried to the framework 46 by roller 66 which runs on track 67.

The mechanism for centering the spindle carrier 26 is constructed as follows (Figs. 1, 2, 8 and 9): The spindle carrier 26 is provided on its under side with a downwardly projecting centering stud 87. This stud is engaged by a pair of centering arms 88 which are keyed to shafts 89 mounted in a bracket 90 forming part of the rotary structure of the machine. Fixed to the lower ends of shafts 89 are rock arms 91 connected by links 92 with the opposite ends of a transverse yoke composed of upper and lower members 93, 94 secured together by pins 95 providing pivotal connections with the links 92. Arranged within the yoke is a block 96 having gudgeons 97 extending through suitable perforations in the yoke members. The block 96 has a circular aperture through which extends a rod 98 provided at its outer end with a set nut 99 and a lock nut 100 and fixed at its inner end to a slide 101 movable in guideways 102 on the framework 46 upon which the slides 44, 52 of the plunger actuating mechanism are carried. Slide 101 is provided with a roller 103 which extends into a cam groove 104 formed in the stationary cam ring 105.

The centering arms 88 are formed with downwardly projecting webs 106 through which are threaded set screws 107 adapted to bear on opposite sides of a web 108 which projects upwardly from the forward portion 109 of the bracket 90. 110 is a coiled spring surrounding rod 98 and interposed between slide 101 and the equalizing block 96.

The operation of the centering mechanism above described is as follows: An outward movement of slide 101 operates, through a movement of rod 98, yoke 93, 94 and links 92, to rotate shafts 89 in the direction to cause arms 88 to bear against opposite sides of the centering stud 87. The precise position in which the centering stud 87 is held is susceptible of variation by adjusting set screws 107. The yoke and link connection between rod 98 and the centering arms provides an equalizing means making accurate adjustment of these connections unnecessary. If one of the centering arms is first to reach the limit of its movement toward the other the yoke 93, 94 will rock on its gudgeons 97 to permit the other centering arm to continue its closing movement.

The spring 110 will be somewhat compressed, as shown in Fig. 8, after the centering arms have been brought into engagement with the stud 87. The spindle carrier is thereby held in its centered position by spring pressure.

It will be understood that while the improvements constituting my present invention are shown and have been described as forming part of the glass blowing machine of the type disclosed in my pending applications above referred to, these improvements are adaptable for use in connection with other glass forming apparatus of different type where similar operations are to be performed.

I claim:

1. In apparatus for making glass articles, the combination of a pivotally supported spindle and centering mechanism for the spindle comprising a pair of pivoted centering arms, a reciprocating element, a transversely extending member having a pivotal relation with said reciprocating element, link connections between said centering arms and said transverse member, and means for adjustable and separately limiting the closing movements of said centering arms.

2. In apparatus for making glass articles, the combination of a pivotally supported spindle and centering mechanism for the spindle comprising a pair of pivoted centering arms, a reciprocating element, a transversely extending member having a pivotal relation with said reciprocating element, link connections between said centering arms and said transverse member, a stop, and means for separately limiting the closing movements of said centering arms with relation to said stop.

3. In apparatus for making glass articles, the combination of a pivotally supported spindle and centering mechanism for the spindle comprising a pair of pivoted centering devices, a slide provided with a rod, a yoke, links connecting said centering devices with the yoke, a block pivoted to said yoke through which said rod extends, a spring interposed between said block and slide, a stop, and adjustable means on said centering devices adapted to bear against said stop.

4. In apparatus for making glass articles, the combination with a pivoted spindle support provided with a centering stud, a pair of pivotally mounted centering devices, a slide provided with a rod, a block slidably mounted on said rod, a spring interposed between said slide and block, a yoke to which said block is pivoted, links connecting said centering devices and yoke, a stop fixed relatively to the centering devices, and set screws on the centering devices adapted to bear against opposite sides of said stop.

5. In apparatus for making glass articles, the combination of a spindle having a plunger and mechanism for imparting longitudinal movement to the plunger comprising a plunger actuating member, a carrier on which said member is movably supported, means for moving the carrier so as to bring the actuating member into substantial alinement with the plunger, and means which operates when said member is in this position to force it against the plunger.

6. In apparatus for making glass articles, the combination of a spindle having a plunger and mechanism for imparting longitudinal movement to the plunger comprising a rocking member, a carrier movable in the direction of its length to which the rocking member is pivoted, means for moving the carrier so as to bring the rocking member into substantial alinement with the plunger, and means which operates when said member is in this position to rock said member and force the same against the plunger.

7. In apparatus for making glass articles, the combination of a spindle having a plunger and mechanism for imparting longitudinal movement to the plunger comprising a rocking member, a slide to which the rocking member is pivoted, means for moving the slide to bring the rocking member into substantial alinement with the plunger, and a stop with which the rocking member engages on further movement of the slide whereby it is oscillated and forced against said plunger.

8. In apparatus for making glass articles, the combination of a spindle having a plunger and mechanism for imparting longitudinal movement to the plunger comprising a rocking member, a slide to which the rocking member is pivoted, means for moving the slide to bring the rocking member into substantial alinement with the plunger, and a stop with which the rocking member engages on further movement of the slide whereby it is oscillated and forced against said plunger, said stop being yieldable for the purpose described.

9. In apparatus for making glass articles, the combination of a spindle adapted to assume a vertical position, having a plunger therein movable longitudinally thereof, a rocking member for imparting movement to the plunger, a slide to which said rocking member is pivoted arranged to move horizontally to bring the rocking member into and out of alinement with the end of the plunger, and means for causing the rocking member to oscillate when alined with the plunger so that it is forced against the plunger.

10. In apparatus for making glass articles, the combination of a spindle adapted to assume a vertical position having a plunger therein movable longitudinally thereof, a slide movable transversely with respect to the spindle, a bell crank pivoted to the slide, one end of which is adapted to bear against the plunger, the other end being bifurcated, a stop member straddled by the bifurcated end of the bell crank having a head at its extremity, and means for moving the slide so as to first bring the first mentioned end of the bell crank into substantial alinement with the plunger and then cause the other end to abut against the stop member whereby the bell crank is rocked to engage the plunger.

11. In apparatus for making glass articles, the combination of a spindle adapted to assume a vertical position having a plunger therein movable longitudinally thereof, a slide movable transversely with respect to the spindle, a bell crank pivoted to the slide, one end of which is adapted to bear against the plunger, the other end being bifurcated, a stop member straddled by the bifurcated end of the bell crank having a head at its extremity, means for moving the slide so as to first bring the first mentioned end of the bell crank into substantial alinement with the plunger and then cause the other end to abut against the stop member whereby the bell crank is rocked to engage the plunger, and a cushioning spring for said stop member substantially as and for the purpose described.

12. In apparatus for making glass articles, the combination with a spindle and a supporting structure on which the spindle is pivotally sustained, of a centering mechanism for the spindle comprising a stop on the frame, and means engaging the stop which is adapted to move the spindle to a determinate position with respect thereto.

13. In apparatus for making glass articles, the combination with a spindle and a supporting structure on which the spindle is pivotally sustained, of a centering mechanism for the spindle comprising a stop on the frame, means engaging the stop which is adapted to move the spindle to a determinate position with respect thereto, and adjusting means for varying said position.

14. In apparatus for making glass articles, the combination with a spindle and a supporting structure on which the spindle is pivotally sustained, of a centering mechanism for the spindle comprising a stop on the frame, a pivoted centering arm adapted to abut against the stop and to move the spindle to a determinate position with respect thereto, means for varying said position, actuating mechanism having movement of definite amplitude, an equalizing member movably connected with the last named member, and a link connecting said equalizing member with the centering arm.

AUGUST KADOW.